United States Patent
Bell

[19]

[11] Patent Number: 5,828,865

[45] Date of Patent: Oct. 27, 1998

[54] DUAL MODE BUS BRIDGE FOR INTERFACING A HOST BUS AND A PERSONAL COMPUTER INTERFACE BUS

[75] Inventor: D. Michael Bell, Beaverton, Oreg.

[73] Assignee: Intel Corporation, Santa Clara, Calif.

[21] Appl. No.: 579,297

[22] Filed: Dec. 27, 1995

[51] Int. Cl.[6] .................................................. G06F 9/318
[52] U.S. Cl. ........................ 395/500; 395/281; 395/306; 395/307; 395/308
[58] Field of Search ..................... 395/500, 287, 395/306, 307, 308, 309, 310, 821, 286, 281, 280

[56] References Cited

U.S. PATENT DOCUMENTS

| | | | |
|---|---|---|---|
| 4,716,527 | 12/1987 | Graciotti | 364/200 |
| 5,226,134 | 7/1993 | Aldereguia et al. | 395/425 |
| 5,255,376 | 10/1993 | Frank | 395/325 |
| 5,396,602 | 3/1995 | Amini et al. | 395/325 |
| 5,450,551 | 9/1995 | Amini et al. | 395/299 |
| 5,499,346 | 3/1996 | Amini et al. | 395/308 |
| 5,522,050 | 5/1996 | Amini et al. | 395/306 |
| 5,568,619 | 10/1996 | Blackledge | 395/281 |
| 5,581,714 | 12/1996 | Amini et al. | 395/308 |
| 5,590,287 | 12/1996 | Zeller et al. | 395/250 |
| 5,592,631 | 1/1997 | Kelly et al. | 395/293 |
| 5,596,725 | 1/1997 | Ferguson et al. | 395/250 |
| 5,603,051 | 2/1997 | Ezzet | 395/822 |
| 5,651,137 | 7/1997 | MacWilliams et al. | 395/468 |
| 5,682,484 | 10/1997 | Lambrecht | 395/308 |

*Primary Examiner*—Kevin J. Teska
*Assistant Examiner*—Thai Phan
*Attorney, Agent, or Firm*—Blakely, Sokoloff, Taylor & Zafman

[57] ABSTRACT

The dual mode bus bridge accommodates either two 64-bit personal computer interface (PCI) buses or four 32-bit PCI buses. In either case, only a single load is applied to the host bus. The dual mode bridge includes a bridge controller unit connected to a pair of expansion bridge units by respective internal buses. Each expansion bridge unit includes two sets of 64-bit wide queues and buffers. For 32-bit PCI operation, the two sets of queues and buffers are operated in parallel. For 64-bit PCI operation, the two sets of queues and buffers are linked together so as to appear in series to provide a single queue structure having twice the depth of the separate queue structures for a 32-bit mode operation. As such, undue duplication of queue and buffer resources is avoided. Method and apparatus embodiments of the invention are described.

10 Claims, 8 Drawing Sheets

DUAL MODE BUS BRIDGE FOR INTERFACING A HOST BUS AND A PERSONAL COMPUTER INTERFACE BUS

BACKGROUND OF THE INVENTION

1. Field of the Invention

The invention generally relates to computer bus systems and in particular to a bridge or interface element for interconnecting a host computer bus with a personal computer interface (PCI) bus.

2. Brief Description of Related Art

PCI bus systems are becoming increasingly popular for use within personal computers, particularly, personal computers configured as file servers. A PCI bus is a high performance, high bandwidth bus configured in accordance with protocols established by the PCI Special Interest Group. A PCI bus is operated in either a 32-bit single address mode, a 32-bit dual address mode, a 64-bit single address mode or a 64-bit dual address mode.

Figure 1A:
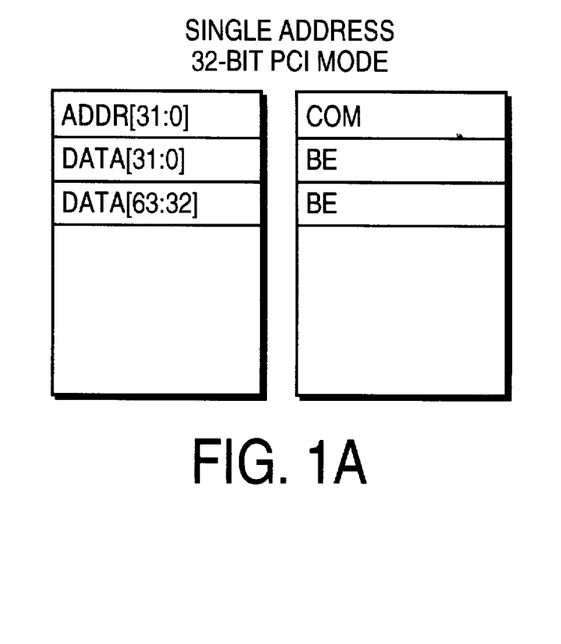
FIG. 1a is a diagram illustrating transmission of addresses and data within a single address mode 32-bit PCI bus system.

In the single address 32-bit mode, a single 32-bit address is employed in connection with 64-bit data packets. FIG. 1a illustrates the arrangement of address and data signals, and related commands and byte enable signals, for a write transaction in the 32-bit single address mode. In a first clock cycle, the PCI bus transmits a 32-bit address and corresponding command bits. In the second clock cycle, the PCI bus transmits a first 32 bits of a 64-bit data packet along with corresponding byte enable bits. If there are more than 32 bits, then during a third clock cycle, the PCI bus transmits the remaining 32 bits of the 64-bit data packet and corresponding byte enable bits. Thus, one transmission of data and a corresponding 32-bit address requires three clock cycles. Although referred to as a 32-bit bus, the bus actually transmits more than 32 bits on each clock cycle, i.e., byte enable and command signals are transmitted simultaneously with 32 bits of address or data.

Figure 1B:
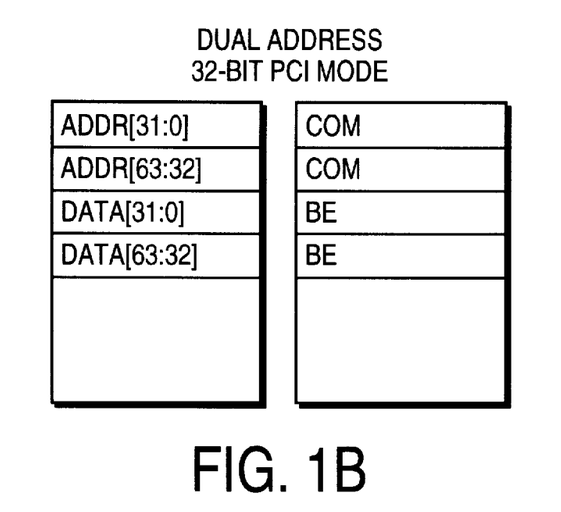
FIG. 1b is a diagram illustrating transmission of addresses and data within a dual address mode 32-bit PCI bus system.

FIG. 1b illustrates the dual mode 32-bit PCI bus protocol. During a first pair of clock cycles, the top and bottom 32 bits of a 64-bit address are transmitted along with corresponding commands bits. During a second pair of clock cycles, the top and bottom 32 bits of a 64-bit data packet are transmitted along with corresponding byte enable bits. Accordingly, four clock cycles are required to transmit 64 bits of data and a corresponding 64-bit address. Three clock cycles are required for 64 bits address and 32 bits of data. As with the single address 32-bit mode, the dual address 32-bit mode actually provides more than 32 bits during each clock cycle.

Figure 1C:
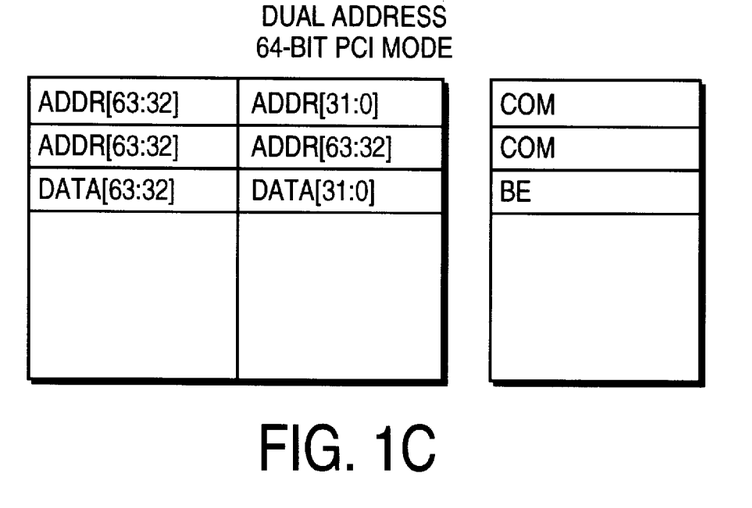
FIG. 1c is a diagram illustrating transmission of addresses and data within a dual address mode 64-bit PCI bus system.

FIG. 1c illustrates a dual address 64-bit PCI mode. During a first clock cycle, all 64 bits of a 64-bit address are transmitted along with corresponding command bits. During a second clock cycle, the upper 32 address bits are repeated on the lower address/data lanes. This is provided so that 32-bit devices can work with 64-bit devices. During a third clock cycle, all 64 bits of a 64-bit data packet are transmitted along with corresponding byte enable bits. As such, only three clock cycles are required to transmit 64 bits and a corresponding 64-bit address. 64 bits of additional data is transmitted on each clock. Hence, the dual address 64-bit PCI mode has twice the bandwidth of the dual 32-bit PCI mode.

Figure 1D:
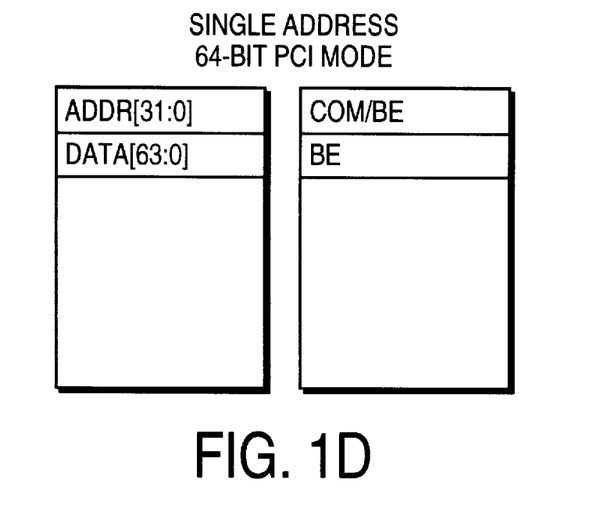
FIG. 1d is a diagram illustrating transmission of addresses and data within a single address 64-bit PCI bus system.

FIG. 1d illustrates the single address 64-bit PCI mode. During a first clock cycle, 32 address bits are transmitted along with command bits. During a second clock cycle, 64 data bits are transmitted along byte enable bits. As such, only two clock cycles are required to transmit 64 bits of data and a corresponding 32-bit address. In all four PCI modes, actual transmission of data may be performed in accordance with burst processing techniques to facilitate high speed transference of data.

In a typical computer system employing a PCI bus, a PCI-to-host interconnection bridge is provided between the PCI bus and a host bus of the computer system. Host computer buses are not typically configured in accordance with PCI protocols. The bridge is provided, in part, to facilitate conversion of data from the PCI format to a format employed by the host bus. Many PCI-to-host bridges are configured to accommodate only a 32-bit PCI bus. Others are configured to accommodate either only a 64-bit PCI bus or only a 32-bit PCI bus. Accordingly, to accommodate more than one PCI bus requires additional PCI-to-host bridges. For many computer systems, particularly file server computer systems, numerous PCI buses must be accommodated. The conventional arrangement, wherein one bridge is required for each PCI bus, offers little flexibility. Moreover, many state of the art host buses are highly sensitive to the number of components, such as bridges, connected to the bus. With such buses the maximum permissible clock rate is often inversely proportional to the number of components connected to the host bus. Accordingly, the connection of additional bridges to the host bus results in a lowering of the maximum permissible clock rate, thereby lowering the overall performance of the system. Such is a particular problem with state of the art computer systems which may include as many as four host processors connected to the host bus along with one or more memory controllers or other components. Within such systems, the connection of an additional PCI bridge may lower the maximum permissible bus rate to a level which significantly hinders the performance of the overall computer system.

Accordingly, it would be desirable to provide an arrangement for interconnecting PCI buses to a host bus which allows further flexibility in connecting 32-bit and 64-bit PCI buses and which does not necessarily require connection of additional loads to the host bus. It is to these ends that aspects of the invention are drawn.

SUMMARY OF THE INVENTION

In accordance with one aspect of the invention, a PCI-to-host bus bridge is provided which accommodates either four 32-bit PCI buses or two 64-bit PCI buses or combinations thereof. The PCI-to-host bridge includes a bridge controller for connection to the host bus and a pair of PCI expander bridges for connection to the PCI buses. Each expander bridge accommodates either two 32-bit PCI buses or one 64-bit PCI bus. Each of the expander bridges are connected to the bridge controller by an external expansion bus. The bus controller includes duplicate sets of input/output (I/O) queues for accommodating transmission of data between the host bus and the two expansion buses. Likewise, each of the expander bridges includes duplicate sets of I/O queues for accommodating transmission of data between the respective internal bus and two 32-bit PCI buses.

In an exemplary embodiment, the internal I/O queues of the expander bridges are configured to accommodate either two separate 32-bit PCI buses or one 64-bit PCI bus. In this regard, each of the queues is configured to accommodate 64 bits, even if operating in only a 32-bit mode. To accommodate two 32-bit PCI buses, the two sets of queues are operated in parallel. To accommodate a single 64-bit PCI bus, the queues are linked to yield a single queue structure having twice the depth of the 32-bit mode queues.

With this arrangement, the PCI-to-host bridge allows for considerable interconnection flexibility. More specifically, the bridge can accommodate either four 32-bit PCI buses, two 64-bit PCI buses, or one 64-bit PCI bus and two 32-bit PCI buses. Of course, the bridge can also accommodate fewer PCI buses as well. The improved flexibility and bandwidth is achieved while applying only a single load to the host bus thereby not significantly degrading the performance of the host bus.

Accordingly, the general disadvantages of many convention systems described above are substantially overcome.

DETAILED DESCRIPTION OF EXEMPLARY EMBODIMENTS OF THE INVENTION

With reference to the remaining figures, exemplary embodiments of the invention will now be described. The exemplary embodiments are described primarily with reference to block diagrams. Each block represents an apparatus element. Depending upon the implementation, the apparatus element, or portions thereof, may be configured in hardware, software, firmware or combinations thereof. It should be appreciated that not all components necessary for a complete implementation of a practical system are illustrated or described in detail. Rather, only those components necessary for a thorough understanding of the invention are illustrated and described. Furthermore, components which are either conventional or may be readily designed and fabricated in accordance with the teachings provided herein are not described in detail.

Figure 2:
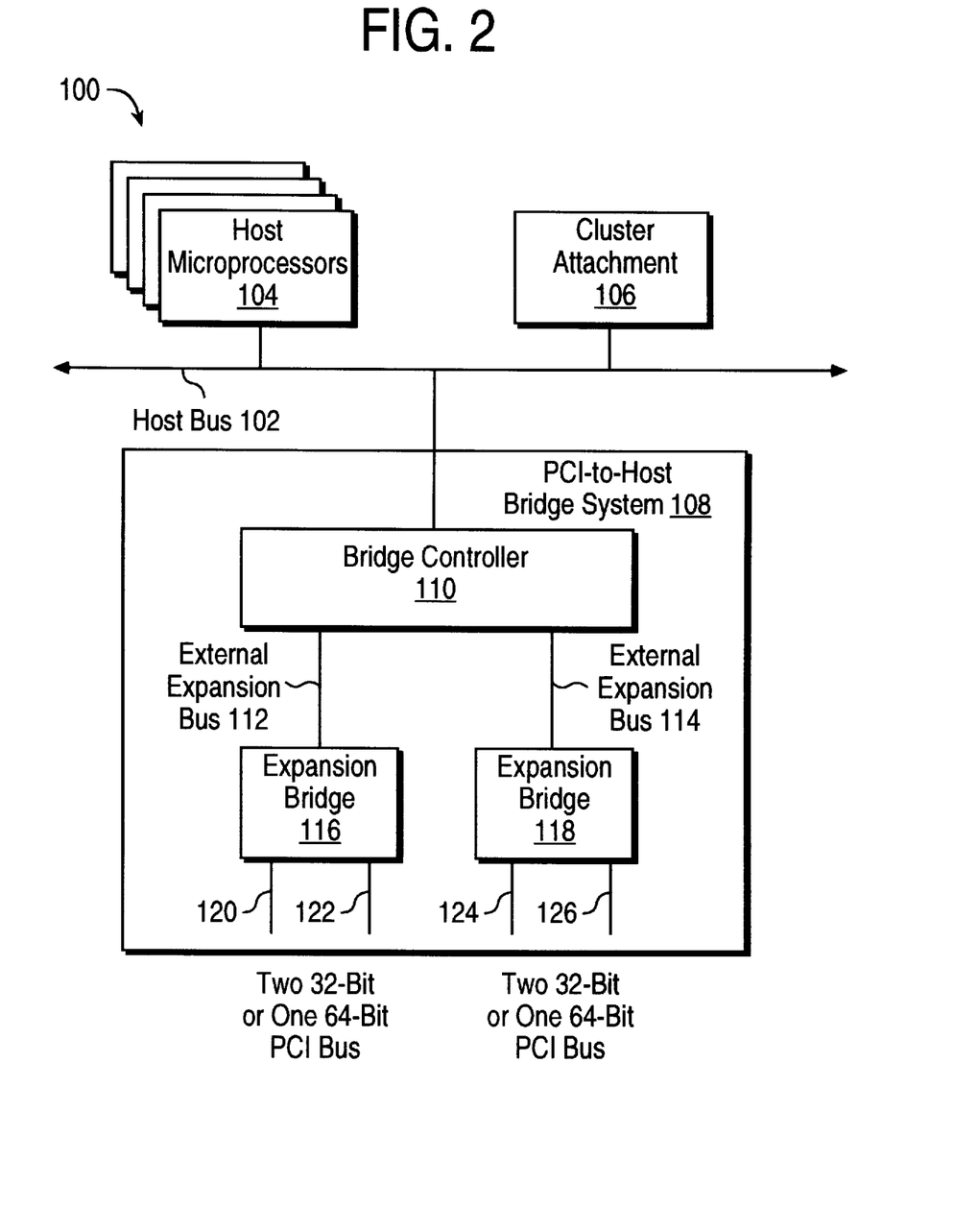
FIG. 2 is a block diagram illustrating a computer system configured in accordance with the invention and having a single PCI-to-host bridge capable of accommodating up to four 32-bit PCI buses.

FIG. 2 illustrates a computer system 100 having a host bus 102 interconnecting a set of host processors 104, a cluster attachment unit 106 and a PCI-to-host bridge 108. Cluster attachment 106 allows computer system 100 to be interconnected with other host processors, perhaps to provide a more sophisticated multi-processing environment. Bridge 108 includes a bridge controller 110 connected by a pair of external expansion buses 112 and 114 to a pair of expander bridges 116 and 118, respectively. Expander bridge 116 includes two 32-bit PCI bus ports 120 and 122 for receiving either two 32-bit PCI buses or one 64-bit PCI bus. Likewise, expander bridge 118 includes two PCI ports 124 and 126 capable of receiving either two 32-bit PCI buses or one 64-bit PCI bus.

With this arrangement, up to four 32-bit PCI buses may be connected to host bus 102. Alternatively, one 64-bit PCI bus and two 32-bit PCI buses may be connected. Of course, fewer PCI buses may also be connected. For example, each expander bridge may receive only a single 32-bit PCI bus. Although up to four PCI buses may be connected to host bridge 102, only a single load is applied to the host bridge by the single bridge controller. Hence, for host bridges of the type wherein a maximum permissible clock speed is inversely proportional to a load applied thereto, the host bus clock speed is unaffected by whether there is only one PCI bus connected through bridge 108 or four PCI buses. Within FIG. 2, bridge controller 110 and expansion bridges 116 and 118 are separate components which may formed on separate integrated circuit chips. Collectively, these components and the expansion buses form the PCI-to-host bridge system. In other arrangements, it may be desirable to place components on a single integrated circuit chip.

Figure 3:
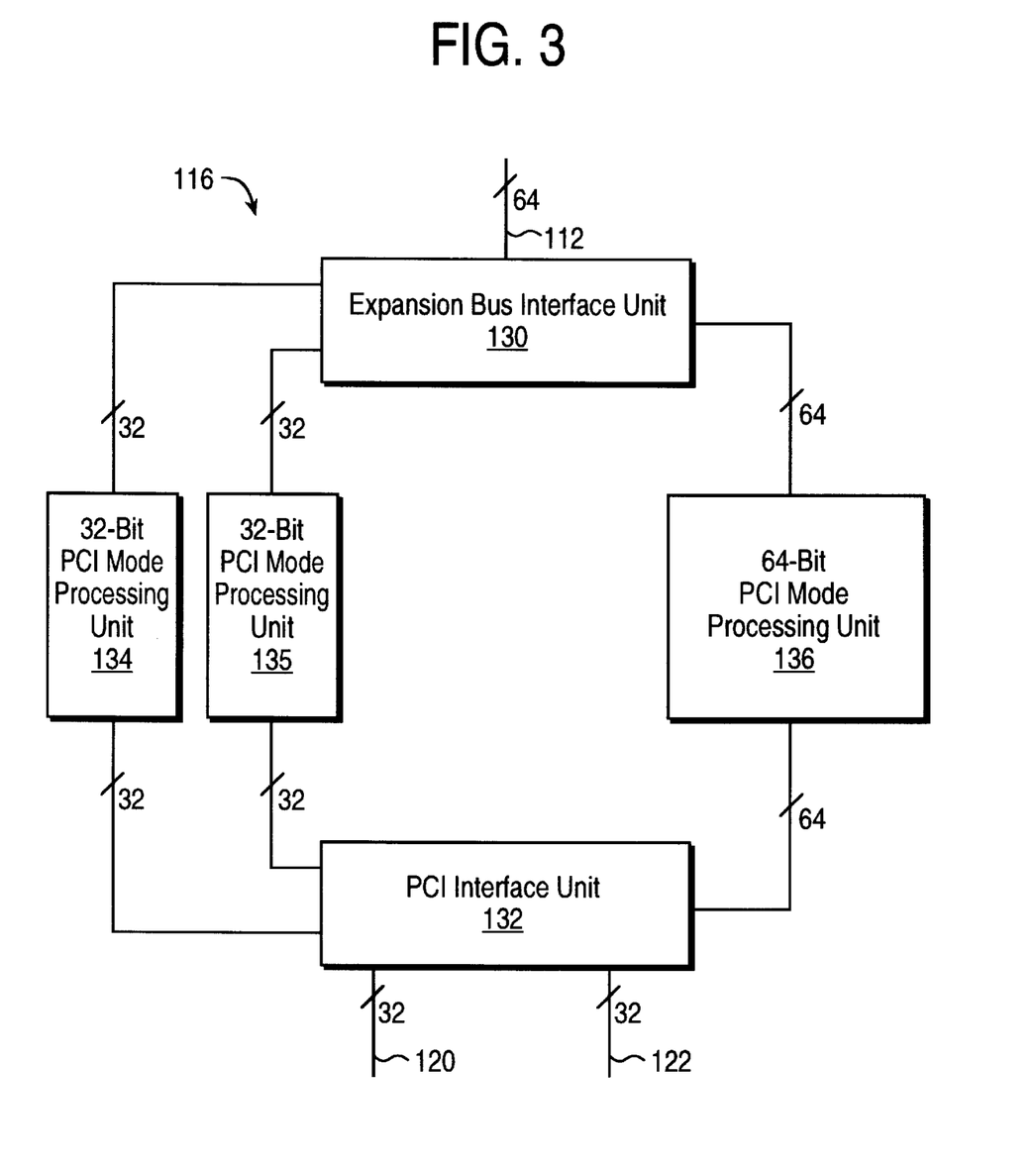
FIG. 3 is a block diagram of an expander bus of the bridge of FIG. 2 for an embodiment having separate sets of queues for 32-bit and 64-bit operations.

FIG. 3 illustrates one possible arrangement for expander bridge 116. Although not separately shown, expander bridge 118 may have a similar arrangement. Expander bridge 116 includes a controller interface unit 130, a bus interface unit 132, a pair of 32-bit mode processing units 134 and 135 and a 64-bit processing unit 136. Bus interface unit 132 includes a pair of 32-bit PCI bus interconnection ports 120 and 122. FIG. 3 also illustrates a portion of expansion bus 112. In FIG. 3, expansion bus 112 is represented a 64-bit bus. The expansion bus may, however, be configured with a different width. Any suitable width may be employed so long as the expansion bus is capable of accommodating a bandwidth equivalent to a 64-bit, 33 MHz PCI bus. In one embodiment, the internal bus is a 16-bit wide bus.

With the arrangement of FIG. 3, either a single 32-bit PCI bus is connected to one of the two ports of bus interface unit 132, a pair of 32-bit PCI buses are connected to both ports, or a single 64-bit PCI bus is connected to both ports. To accommodate a single 64-bit PCI bus, half of the connection lines of the bus are connected to port 120 and half are connected to port 122. The latter is in accordance with conventional 64-bit PCI bus interconnection techniques. In use, bus interface unit 132 determines whether a single 32-bit bus, two 32-bit buses, or a single 64-bit bus are connected. If the single 32-bit bus is connected to, for example, port 120, bus interface unit 132 routes the signals received therefrom along a first 32-bit internal interconnection line to 32-bit processing unit 134 which incorporates suitable 32-bit wide queues and data buffers for processing the data. The processing unit 134 in turn routes the signals to the single 32-bit bus to controller interface unit 130 for subsequent output to the bridge controller (FIG. 2) over expansion bus 112. The signals routed may include data signals, address signals, byte enable signals, command signals, and any other necessary signals associated with the PCI bus and the internal bus. The signals may correspond either to the single address 32-bit PCI mode or the dual address 32-bit PCI mode.

If a pair of 32-bit PCI buses are interconnected to the bus interface unit, then signals therefrom are simultaneously routed through both 32-bit processing units 134 and 135 to controller interface unit 130 for a subsequent transmission over the internal bus to the bridge controller. The second 32-bit processing unit includes duplicate queues and buffers to that of the first unit for parallel processing of the additional 32-bits of signals. Both processing units 134 and 135, as well as interface units 130 and 132, are configured to accommodate both the single address 32-bit PCI mode or the dual address 32-bit PCI mode.

For connection of a single 64-bit bus to bus interface unit 132, signals from the left and right halves of the 64-bit bus are merged within the bus interface unit then routed through the 64-bit processing unit to the controller interface unit for subsequent output to the bridge controller (FIG. 3) over the internal bus line. 64-bit processing unit 136 includes 64-bit wide queues and buffers necessary for handling transference of the 64-bit PCI signals.

Hence, in the arrangement of FIG. 3, signals are either routed through internal 32-bit queues or through internal 64-bit queues depending upon the PCI bus or buses connected thereto. Each of the components also includes suitable internal queues, buffers and other units for routing signals from the internal bus for output onto the PCI buses. Furthermore, each of the components includes whatever devices are necessary for converting signals between the PCI processing protocol and the protocol of expansion bus 112.

The exact implementation and configuration of the internal queues, buffers and the like may depend on many factors including, for example, the bus protocol of the internal bus 112. Accordingly, no attempt is made herein to specify all possible arrangements or embodiments of internal components of the expansion bridge. Those skilled in the art can readily provide the necessary queues and buffers for routing signals between the PCI ports and the internal bus given a selected internal bus protocol. One example of suitable queues and buffers which may be employed within the expander bridge of FIG. 3 will be described below with respect to alternative embodiments.

Figure 4A:
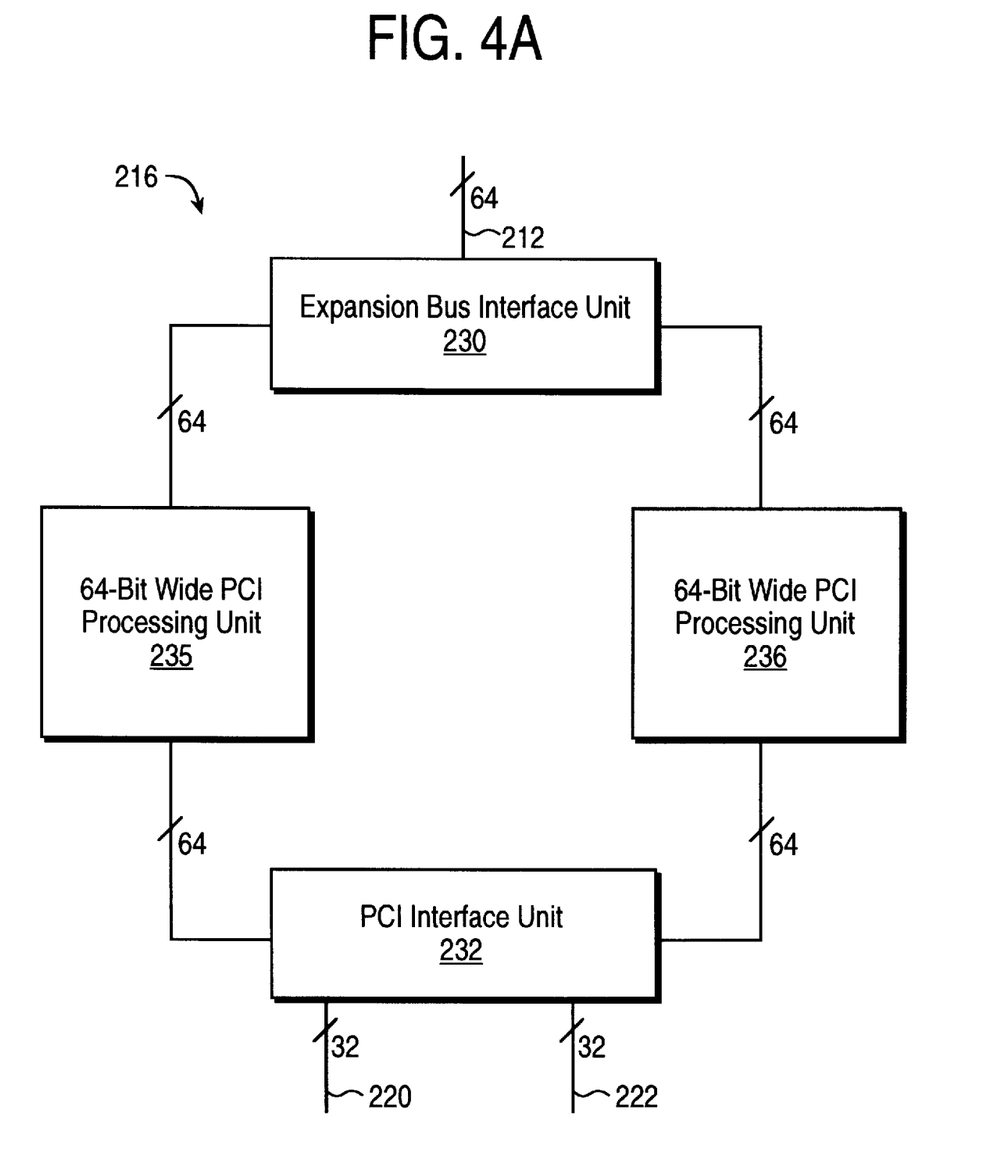
FIGS. 4a and 4b are block diagrams illustrating an alternative expansion bus of the bridge of FIG. 2 having a single set of queues employed in parallel for 32-bit PCI processing and serially for 64-bit PCI processing.
Figure 4B:
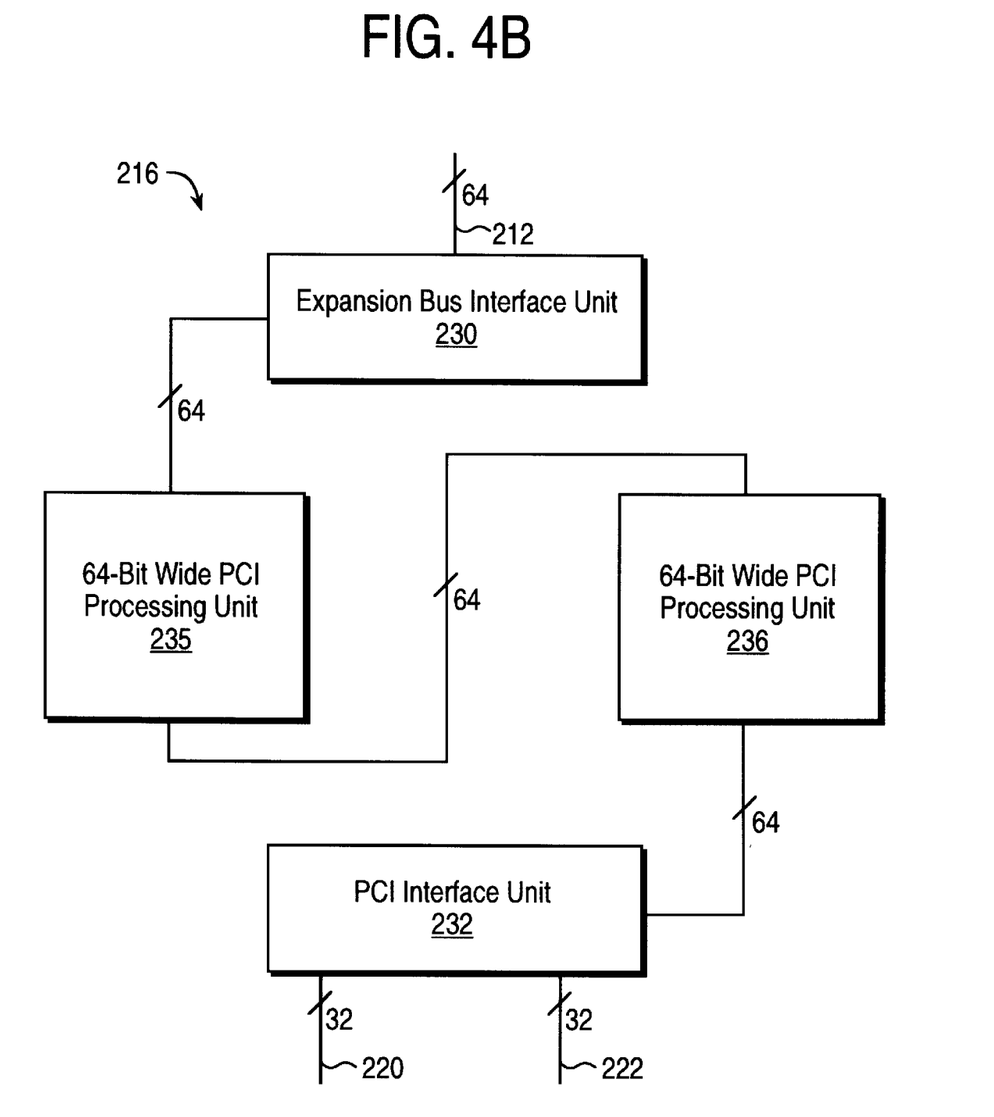

Thus, FIG. 3 illustrates an embodiment of the expander bridge wherein signals corresponding to a 64-bit PCI bus are routed separately from signals corresponding to one or more 32-bit buses. In the following, alternative arrangements are described wherein a single set of internal queues and buffers are provided within each expander bridge for accommodating either two 32-bit PCI buses or one 64-bit PCI bus. In particular, an arrangement is described wherein a single set of 64-bit wide queues and buffers are employed in parallel for dual 32-bit mode processing and in series for single 64-bit processing. This arrangement is illustrated at a high level in FIGS. 4a and 4b. FIGS. 4a and 4b illustrate an expander bus similar to that of FIG. 3 and like components are represented with like reference numerals incremented by 100.

More specifically, FIG. 4a illustrates routing of signals received from two 32-bit PCI buses through duplicate internal processing units 235 and 236 having duplicate 64-bit wide queues and buffers. FIG. 4b illustrates routing of signals from a single 64-bit bus through the internal pair of processing units in series. With the arrangement of FIG. 4b, internal queues and buffers within the processing units are linked together to form queues and buffers twice as deep as those of the arrangement of FIG. 4a. By employing the arrangement of FIGS. 4a and 4b, rather than the arrangement of FIG. 3, unnecessary duplication of internal queues and buffers is avoided. Of course, more complex internal routing circuitry may be acquired.

Specific Example Embodiment

Figure 5:
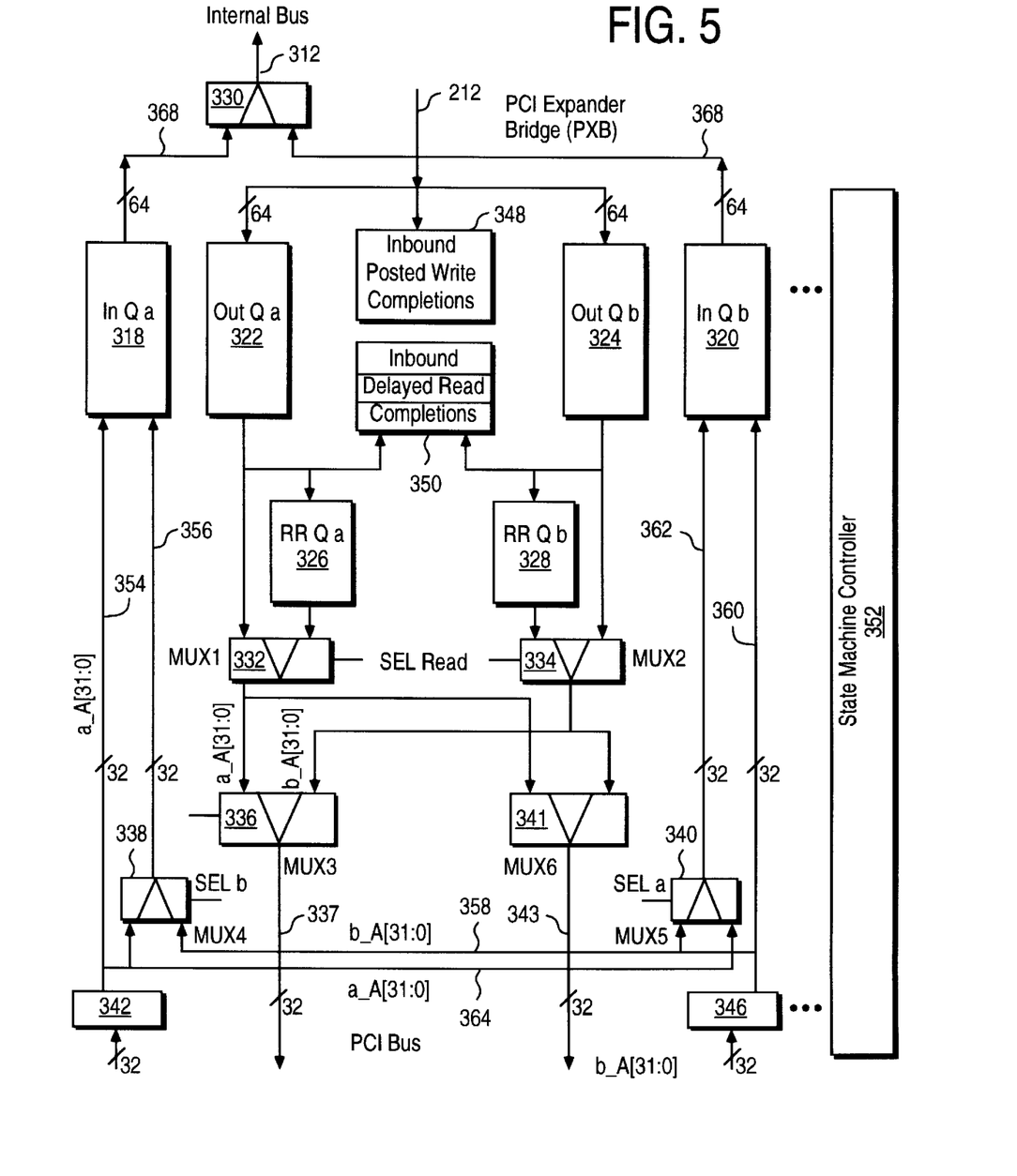
FIG. 5 is a block diagram illustrating a specific exemplary arrangement of transaction queues in accordance with the expansion bus arrangement of FIG. 4.

FIG. 5 illustrates a specific exemplary arrangement for transaction queues corresponding to the expander bus of FIGS. 4a and 4b. More specifically, FIG. 5 illustrates an expander bus transaction unit 316 having, as principal components, a pair of input queues 318 and 320, a pair of output queues 322 and 324, and a pair of read request queues 326 and 328. Transaction unit 316 also includes seven multiplexers, 330,332,334,336,340 and 341, connected as shown, and a pair of 32-bit PCI input ports 342 and 346. An inbound posted write completion unit 348 and an inbound delayed read completion unit 350 are also provided. Finally, a state machine 352 is interconnected to each of the aforementioned components for controlling operation thereof.

Operation of transaction unit 316 will be described initially with reference to the inputting of data from ports 342 and 346 to expansion bus 312 connected to multiplexer 330. Then, the outputting of the transactions from the expansion bus to the PCI ports will be described.

For 64-bit mode inbound transactions, the top and bottom 32 bits of a transaction are received substantially simultaneously on input ports 342 and 346, respectively. A first 64-bit inbound transaction is pushed onto input queue 318. The next input transaction is pushed into input queue 320. Additional input transactions are alternatingly pushed into queues 318 and 320 thereby toggling between the two input queues. After internal bus interface 312, a transaction is first pulled from queue 318, then from queue 320, and so forth. For example, a four line inbound posted write will result in a line write into queue 318 first, then a line write into queue 320, and so forth. The foregoing toggling occurs even though the transaction may appear as a single burst on the PCI bus. Toggling of the two input queues is controlled by state machine 352 which includes an input queue pointer (not separately shown) which identifies the input queue ready to receive the next input transaction signals.

To achieve toggling of queues 318 and 320, each queue includes two inputs with one input connected directly to the corresponding input port and the other connected through a multiplexer to the opposite input port. More specifically, input queue 318 is connected directly to port 342 by 32-bit connection line 354 and is connected to port 346 through 32-bit connection line 356, multiplexer 338, and 32-bit connection line 358. Likewise, input queue 320 is connected directly to port 346 by a 32-bit connection line 360 and to port 342 by a 32-bit connection line 362, multiplexer 340, and a 32-bit connection line 364. As can be seen from FIG. 5, multiplexer 338 is also connected to line 364 and multiplexer 340 is also connected to line 358.

On a first clock cycle of a first inbound transaction, 32 bits received by port 342 are transmitted to input queue 318. Simultaneously, 32 bits received by port 346 are routed through multiplexer 338 to input queue 318 over line 356. During the first transaction, queue 320 ignores any input signals received. During the second transaction, queue 320 receives 32 bits from port 346 along line 360 and 32 bits from port 342 along line 364 via multiplexer 340. In this manner, the above-described toggling between queue 318 and queue 320 is achieved. Ultimately, transactions received by queues 318 and 320 are pulled therefrom and output along 64-bit connection lines 366 and 368, respectively, to internal bus 312 through multiplexer 330. Operation of the various queues and multiplexers is controlled by state machine 352.

For 32-bit inbound transactions, multiplexers 338 and 340 are switched to opposite states from that of the 64-bit mode. Hence, during a first clock cycle, 32 bits received from port 342 are presented to queue 318 along both lines 354 and 356. Line 356 is pushed to zeros for a 32-bit address.

Similarly, during the first clock cycle, 32 bits received from port 346 are routed to queue 320 over both lines 360 and 362. Here, it should be noted that the ports 342 and 346 operate independently.

Queues 318 and 320, which are both 64-bit address queues, represent the received 32 bits of address or 64 bits in dual address mode PCI internally as 64-bit addresses. The resulting 64-bit addresses ultimately are pulled from the queues as described above for 64-bit input. Accordingly, expansion bus 312 receives alternating 64-bit addresses corresponding to the addresses received in parallel along ports 342 and 346. Since the addresses are output to the expansion bus half as fast as addresses are input through ports 342 and 346, queues 318 and 320 may become filled during operation. Conventional bus processing techniques may be employed for preventing queue overflow.

Now, outputting of transaction addresses through transaction unit 316 will be described. Initially, an overview will be provided. Then, 64-bit and 32-bit output examples will be described with reference to these specific components illustrated in FIG. 5.

Outbound transaction queues 322 and 324 operate in much the same manner as the inbound transaction queues. If an outbound transaction from the expansion bus interface enters queue 322, the next outbound transaction will be routed to queue 324, and so forth. At the PCI interface, the state machine toggles between outputs from queue 322 and 324. Starting at queue 322, the first outbound transaction is attempted on the PCI bus. If the transaction completes, the transaction is popped from queue 322 and a completion packet is pushed into one of the input queues 318 or 320 by the state machine. The input queues selected to receive the completion packet is merely the input queue pointed to by the inbound queue pointer of state machine 352. Next, the transaction at the top of output queue 324 is attempted. If every outbound transaction completes on the first attempt, the outbound queue pointer is continuously toggled with each completed transaction.

If a read transaction at the top of one of the outbound queues must be retried, as a result of a failed attempt, the read transaction is moved into the corresponding read request queue 326 or 328 and the outbound queue pointer toggles to the other outbound queue. If a write transaction at the top of one of the outbound queues must be retried, the queue pointer does not toggle. Rather, a retried write must succeed before the outbound queue pointer will toggle to the opposite queue. However, between attempts to complete the write at the top of the current outbound queue, any reads in either read request queue may also be attempted. Once the current outbound write succeeds, the write address is popped from the corresponding queue and a completion packet is inserted into the current inbound queue in the same manner as described above. The outbound queue pointer is then toggled to the opposite queue, even if an uncompleted read remains in the corresponding read request queue.

Hence, the outbound queue pointer toggles to the opposite queue as soon as a transaction is popped from the current queue. A retried write is not popped until it succeeds. A retried read is popped from the outbound queue and pushed into the read request queue. A read in a read request queue can be attempted at any time since associated ordering requirements are met at the time the read was popped from the outbound queue. Note that outbound reads in one read request queue can pass outbound reads in the other read request queue for the 64-bit PCI mode.

Ultimately, outbound transactions are routed either through multiplexer 336, multiplexer 341, or both, onto output lines 337 and 343 which form part of the PCI bus. When operating in connection with two separate 32-bit PCI buses, 32-bit transactions for one of the buses are routed on the line 337 through multiplexer 336 and 32-bit transactions for the other bus are routed along line 343 through multiplexer 341. For 64-bit operation, the entire 64-bit transaction is either stored within output queue 322 or output queue 324. In some circumstances, the upper 32 bits for transaction stored within output queue 322 will be output along line 337 and the lower 32 bits of that transaction will be output along line 343.

Figure 6:
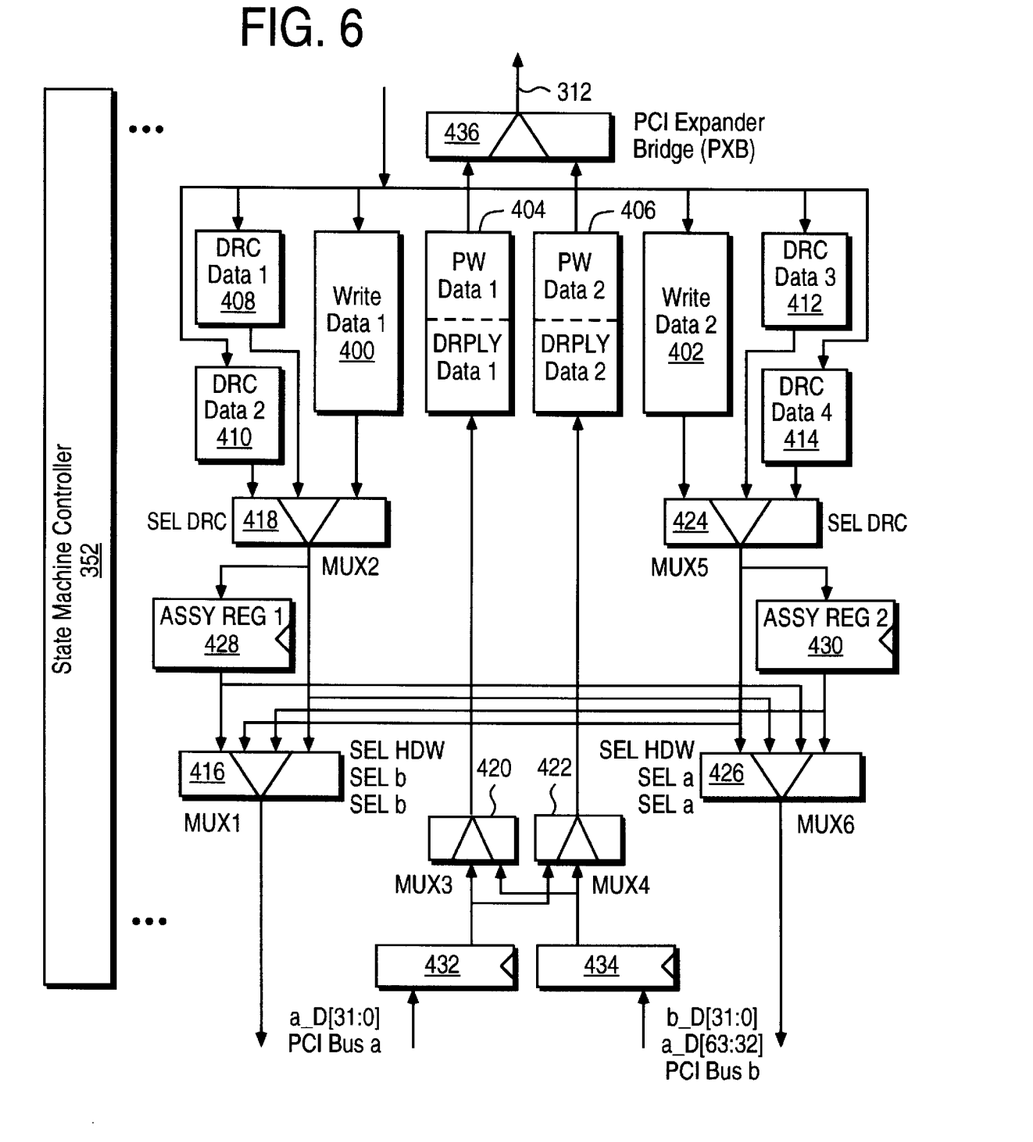
FIG. 6 is a specific exemplary embodiment of an arrangement of data buffer queues in accordance with the PCI expansion bus of FIG. 4.

FIG. 6 illustrates data queues for use in connection with the transaction unit of FIG. 5. The data queue structure includes a pair of output write data queues 400 and 402, a pair of posted write queues 404 and 406, four delayed read completion queues 408–414 and six multiplexers 416–426. A pair of assembly registers 428 and 430 are also provided. Data is received from a pair of 32-bit PCI buses through ports 432 and 434 and is output to the expansion bus 312 through yet another multiplexer 436.

Output multiplexers 416 and 426 are interconnected to both multiplexers 418 and 424 to allow 32 bits of data output from the left data queues or the right data queues to be output through either the upper or lower PCI buses connected, respectively, to multiplexers 416 and 426. Each of various data queues are 32 bits wide. For 64-bit mode operation, the top 32 bits may be output on the lower PCI bus through multiplexer 416 while the lower 32 bits are output through the upper PCI bus through multiplexer 426, and vice versa.

Operation of the data unit of FIG. 6 (with continued reference to FIG. 5) is as follows. The data for PCI transactions is stored in the aforementioned separate queue structure from the transaction queues. This data queue structure is referred to as the data buffers or data queues. Separate queues are needed for data because the transactions and completions in the transaction queues are not always retired in the same order that they enter the transaction queues. For example, write transactions may pass read transactions in the same direction. Also, PCI delayed reads are retired in the order that the PCI masters (not shown) return to collect data (which is not necessarily the same order that the read requests or read data were received).

In dual 32-bit PCI mode, when an inbound PCI write transaction enters In Q a 318, the data that follows the address and command on the PCI bus will enter the PW Data1 inbound data queue 404. When the associated write packet is sent over the expansion bus 312, the packet header containing the write command and address is pulled from the In Q a transaction queue 318 and the write data will be pulled from the PW Data1/DRPLY Data1 inbound data queue 404. Likewise, an inbound PCI write on the upper PCI Bus pushes the command and address into In Q b 320 and the associated data that follows on the PCI bus is pushed into PW Data 2 406 inbound data queue.

In dual 32-bit PCI mode, an outbound 32-bit PCI read to the lower PCI bus is pulled from Out Q a 322 or RR Q a 326 when the read succeeds on the PCI bus and a Read Completion is pushed into the In Q a inbound transaction queue 318. The associated read data enters the PW Data1/DRPLY Data1 inbound data queue 404. When the Completion packet is sent over the expansion bus, the packet header containing the read completion identifier is pulled from the top of the In Q a transaction queue 318 and the read data is pulled from the PW Data1/DRPLY Data1 inbound data queue 404.

Each 32-bit PCI port can have two inbound PCI reads outstanding. An inbound PCI read on PCI port a 342 is pushed into In Q a 318 if there is slot available in the queue for a read and there are inbound read data buffers available in the expansion bridge and the bridge controller. At this time, the Inbound Delayed Read Completion Tracker 350r is loaded with the command and address fields of the inbound read so that it can identify the PCI master requesting the read. A transaction identifier unique to this inbound transaction is also loaded into the Inbound Delayed Read Completion Tracker 350 so that the read Completion can be identified when it arrives in the Out Q a 322. When the inbound read completes on the host bus, a Delayed Read Completion (DRC) packet containing the read data will arrive to the expansion bridge over the expansion bus. The DRC transaction header containing the inbound read identifier will be pushed into Out Q a 322. The read data that follows in the packet will be pushed into DRC Data 1 data queue 408 or DRC Data 2 data queue 410 depending upon which DRC data queue was assigned to this inbound read. When the PCI master returns for its data (it will be continuously retried until the data arrives) the PCI master will receive the data from DRC Data 1 408 or DRC Data 2 410 data queue if the associated inbound read completion has been popped from the top of the Out Q a transaction queue 322 and marked the inbound read as complete in the Inbound Delayed Read Completion Tracker 350.

In 64-bit PCI mode, the two sets of data buffer queues are paired similar to the transaction queue in 64-bit PCI mode. An inbound write will result in data being alternately pushed into PW Data 1 404 and PW Data 2 406 data queues. The data queues are 32 bits wide (DWord). If data is received 64 bits at a time from a 64-bit PCI master and the data queue pointer is pointing at PW Data 1 queue 404, the first DWord is pushed into PW Data 1 data queue 404 and the next DWord is pushed into PW Data 2 data queue 406. Additional DWords alternate between the two inbound data queues. Note that the upper and lower DWords of a 64-bit chunk of data from the PCI bus may go into either inbound data queue depending upon where the data queue pointer is currently pointing. This results from two factors. First, data buffers are always allocated as DWords. Second, 32-bit PCI masters may perform an odd number of DWord transfers thereby leaving the data queue pointer pointing to an odd boundary when a new 64-bit transaction begins.

The DRC data queues and Write data queues are paired and interleaved in a similar fashion.

Assembly registers 428 and 430 are provided for the following reason. Circumstances may arise where a PCI master inserts a wait state while pulling data from the expansion bridge. To accommodate the wait state, data that would otherwise be provided during the wait state is stored within one of the assembly registers. After the wait state, the data is output from the assembly register. The assembly register is provided, in part, because, after the wait state, the respective data pointers will be pointing to different data as a result of the aforementioned toggling operations. Hence, the assembly registers help prevent loss of data during wait state.

Also, in considering the foregoing, it should be noted that the expansion bridge preferably operates at a clock rate two or three times as fast as the PCI bus allowing multiple operations to be performed within the expansion bridge during one clock cycle of the PCI bus to allow transactions to be input or output from the various queues and assembled or disassembled, as needed. Also, for a 64-bit mode operation, in accordance with PCI protocol, the expansion bridge initially begins in a 32-bit mode for three or four clocks until the bridge receives acknowledgment from the PCI device indicating whether the PCI device is also capable of 64-bit operation. Thereafter, the expansion bridge switches to full 64-bit mode.

Thus, the structure and operation of a suitable transaction unit and a suitable data unit for use within each of the expander buses of FIG. 3 has been described.

What has been described are various embodiments of a PCI-to-host bridge capable of accommodating either two 64-bit PCI buses or four 32-bit PCI buses. Specific exemplary embodiments have been described herein for the purposes of illustrating the principles of the invention. The principles of the invention, however, may be implemented in a wide range of other embodiments. Accordingly, the exemplary embodiments should not be construed as limiting the scope of the invention.

What is claimed is:

1. A computer system comprising:

a host bus;

at least one microprocessor connected to said host bus;

a first PCI bus capable of operating in either a 32-bit bus mode or a 64-bit bus mode;

a second PCI bus capable of operating in either the 32-bit bus mode or the 64-bit bus mode; and an interface device for interfacing the first PCI bus and the second to the host bus, with said interface device including means for either coupling the first PCI bus and the second PCI bus operating in 32-bit mode with parallel 32-bit transmission paths to the host bus or coupling the first PCI bus operating in 64-bit mode to the host bus with a single 64-bit transmission path having a first set of transmission queues having a 64-bit data width, a second set of transmission queues having a 64-bit data width, and means for operating the first and second sets of queues in parallel for dual 32-bit operation and for operating the first and second sets of queues alternatively in series for a single 64-bit operation mode.

2. An interface device for interfacing first and second 32-bit PCI buses to a second bus, said interface device comprising:

a first set of queues for routing data and addresses between the first PCI bus and the second bus;

a second set of queues for routing data and addresses between the second PCI bus and the second bus;

means for operating the first and second sets of queues in parallel for dual 32-bit data transmission operation; and means for operating the first and second queues alternatively in series for single 64-bit data transmission operation.

3. The interface device of claim 2 further including:

an external 16-bit bus connected to both the first and second sets of queues; and a third set of queues interconnecting the second bus with the primary bus, said third set of queues each having widths of 64 bits.

4. In a computer system having an interface device for interfacing an external bus to a host microprocessor bus wherein the external bus is capable of operating in a first mode corresponding to N bits and a second mode corresponding to 2N bits, an improvement comprising:

configuring the interface device to provide either a pair of separate simultaneous N-bit interface paths or a single 2N-bit interface path, wherein the interface device includes a first set of 2N-bit transmission queues and a second set of 2N-bit queues, further wherein the interface device operates the first and second sets of queues in parallel for dual N-bit operation and operates the first and second sets of queues alternatively in series for single 2N-bit operation.

5. A bus bridge comprising:

an expansion bus interface to communicate with a system bus;

a first, a second, and a third bus interface paths coupled to the expansion bus interface;

a bus interface unit coupled to the first, the second and the third bus interface paths, to communicate with a bus using either a pair of separate and simultaneous interface paths of a first size, or a single interface path of a second size, wherein the bus interface unit further comprises a first set of transmission queues and a second set of queues, the bus interface unit operating the first and second sets of transmission queues in parallel for dual first size operation and alternatively in series for second size operation.

6. The bus bridge of claim 5, wherein the first size is 32 bits.

7. The bus bridge of claim 5, wherein the second size is 64 bits.

8. The bus bridge of claim 5, wherein the first bus interface path and the second bus interface path are of the first size.

9. The bus bridge of claim 5, wherein the third bus interface path is of the second size.

10. The bus bridge of claim 5, wherein the bus conforms to the Peripheral Component Interconnect (PCI) bus standard.

* * * * *